(12) United States Patent
Hillberg et al.

(10) Patent No.: US 9,053,017 B2
(45) Date of Patent: Jun. 9, 2015

(54) MANAGING OBJECT LIFETIME IN A CYCLIC GRAPH

(75) Inventors: Michael John Hillberg, Beaux Arts Village, WA (US); Raja Krishnaswamy, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 75 days.

(21) Appl. No.: 13/598,247

(22) Filed: Aug. 29, 2012

(65) Prior Publication Data

US 2013/0066927 A1 Mar. 14, 2013

Related U.S. Application Data

(60) Provisional application No. 61/533,134, filed on Sep. 9, 2011.

(51) Int. Cl.
*G06F 12/00* (2006.01)
*G06F 17/30* (2006.01)
*G06F 12/02* (2006.01)

(52) U.S. Cl.
CPC .................................. *G06F 12/0261* (2013.01)

(58) Field of Classification Search
CPC .................................................. G06F 12/0253
USPC ........................................................ 707/814
See application file for complete search history.

(56) References Cited

U.S. PATENT DOCUMENTS

| | | |
|---|---|---|
| 5,088,036 A | 2/1992 | Ellis et al. |
| 5,920,876 A | 7/1999 | Ungar et al. |
| 6,182,107 B1 | 1/2001 | Atsatt |
| 6,314,436 B1 | 11/2001 | Houldsworth et al. |
| 6,363,403 B1 | 3/2002 | Roy et al. |
| 6,393,439 B1 | 5/2002 | Houldsworth et al. |
| 6,421,690 B1 | 7/2002 | Kirk, III |

(Continued)

FOREIGN PATENT DOCUMENTS

CN 101046755 A 10/2007

OTHER PUBLICATIONS

Wilhelmsson, Jesper, "Efficient Memory Management for Message-Passing Concurrency Part I: Single-threaded Execution", In Dissertation for the Degree of Licentiate of Philosophy in Computer Science at Uppsala University, May 2005, 114 pages.

(Continued)

*Primary Examiner* — Khanh Pham
*Assistant Examiner* — Van Oberly
(74) *Attorney, Agent, or Firm* — John Jardine; Raghu Chinagudabha; Micky Minhas

(57) ABSTRACT

The present invention extends to methods, systems, and computer program products for managing object lifetime in a cyclic graph. Embodiments of the invention include reclaiming allocated system resources, for example, from a graph of objects that mixes different resource reclamation techniques (such as reference counting and garbage collection). In response to determining that garbage collection is to be performed, references between GC objects and Ref. Counted objects are detected. A reference type (e.g., direct, indirect, standard, tracked, weakened, etc.) for any detected references is also determined. Garbage collection is performed to determine if any allocated system resources can be reclaimed. Garbage collection considers references and references types between GC objects and Ref. Counted objects when determining if objects are to be reclaimed.

14 Claims, 9 Drawing Sheets

(56) References Cited

U.S. PATENT DOCUMENTS

| | | |
|---|---|---|
| 6,453,463 B1 | 9/2002 | Chaudhry et al. |
| 6,662,274 B2 | 12/2003 | Subramoney et al. |
| 6,874,074 B1 | 3/2005 | Burton et al. |
| 6,883,172 B1 | 4/2005 | Angeline et al. |
| 6,925,637 B2 | 8/2005 | Thomas et al. |
| 7,092,978 B2 | 8/2006 | Garthwaite |
| 7,251,671 B2 | 7/2007 | Wu et al. |
| 7,310,655 B2 | 12/2007 | Dussud |
| 7,315,873 B2 | 1/2008 | Lewis |
| 7,451,168 B1 | 11/2008 | Patterson |
| 7,565,386 B2 | 7/2009 | Joisha |
| 2002/0107880 A1 | 8/2002 | Bacon |
| 2002/0129343 A1 | 9/2002 | Pinter et al. |
| 2002/0199065 A1 | 12/2002 | Subramoney et al. |
| 2003/0069905 A1 | 4/2003 | Dussud |
| 2003/0191783 A1* | 10/2003 | Wolczko et al. ............. 707/206 |
| 2003/0221047 A1 | 11/2003 | Ahmed |
| 2005/0289307 A1 | 12/2005 | Achanta et al. |
| 2007/0162527 A1 | 7/2007 | Wright et al. |
| 2007/0203960 A1* | 8/2007 | Guo ............................. 707/206 |
| 2007/0255909 A1 | 11/2007 | Gschwind et al. |
| 2008/0270482 A1 | 10/2008 | Hillberg et al. |
| 2009/0265402 A1* | 10/2009 | Dussud et al. ............... 707/206 |
| 2011/0219204 A1* | 9/2011 | Caspole ....................... 711/173 |
| 2011/0252199 A1* | 10/2011 | Serrano et al. ............... 711/118 |

OTHER PUBLICATIONS

Lieberman, et al., "A Real-Time Garbage Collector Based on the Lifetimes of Objects", In Proceedings of Communications of the ACM, vol. 26, Issue 6, Jun. 1983, 19 pages.

Venstermans, Kris, et al., "Space-Efficient 64-bit Java Objects through Selective Typed Virtual Addressing", Code Generation and Optimization, 2006. CGO 2006. International Symposium on Code Generation and Optimization, Mar. 26-29, 2006 p. 11 pages.

Campos, Alvaro E. ,et al., "Garbage Collection in Distributed EZ", Proceedings of the XIII International Conference of the Chilean Computer Science Society, La Serena, Chile, Oct. 1998, pp. 251-259.

Goetz, Brian, "Java theory and practice: Garbage collection in the HotSpot JVM", Nov. 25, 2003, 6 pages.

Garner, Robin, et al., "Effective Prefetch for Mark-Sweep Garbage Collection", ISMM'07, Oct. 21-22, 2007, Montreal, Quebec, Canada, 12 pages.

U.S. Appl. No. 12/107,483, Dec. 8, 2010, Office Action.

U.S. Appl. No. 12/107,483, Mar. 31, 2011, Notice of Allowance.

"Supplementary Search Report Issued in European Patent Application No. 12829976.5", Mailed Date: Jan. 12, 2015, 9 Pages.

* cited by examiner

MANAGING OBJECT LIFETIME IN A CYCLIC GRAPH

CROSS-REFERENCE TO RELATED APPLICATIONS

The present application claims the benefit of U.S. Provisional Patent Application Ser. No. 61/533,134, entitled "LIFETIME MANAGEMENT FOR A CYCLIC GRAPH OF OBJECTS THAT MIX REFERENCE COUNTING AND GARBAGE COLLECTION", filed Sep. 9, 2011, which is incorporated by reference herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Some programming environments (e.g., C++) use reference counting as a mechanism to determine when objects are not longer referenced and thus the memory used to store objects can be released. The lifetime of objects is managed by removing an object from memory if it cannot be directly referenced. When one object references another object the reference count for the referenced object is incremented. When an object dereferences another object the reference count for the object is decremented. When the reference count for an object reaches zero it is inaccessible and can be destroyed.

However, reference counting is relatively unsophisticated and can lead to memory leaks (i.e., unused and likely inaccessible objects continue to consume memory). For example, it may be that two objects reference each other but are not referenced by any other objects resulting in a cycle. When a cycle occurs, reference counting may be unable to determine that both objects simply reference each other but are otherwise unreferenced. As such, memory for the two objects is not released causing a memory leak.

Other programming environments (e.g., C#) use garbage collection as a mechanism to determine when objects are no longer referenced and thus the memory used to store objects can be released. Garbage collection manages the lifetime of objects by finding objects that cannot be referenced directly or indirectly and removing them. Garbage collection addresses the problems associated with cycles by taking indirect references into account.

Some programming environments utilize reference counted objects and garbage collected objects. For example, a developer may wish to take advantage of different programming languages that use different object lifetime management techniques. In these mixed programming environment, reference counted objects can reference garbage collected objects and/or garbage collected objects can reference counted objects. However, a garbage collection system may be incapable of tracking indirect references through a reference counted objects. As such, in a mixed programming environment, memory leaks can still occur.

BRIEF SUMMARY

The present invention extends to methods, systems, and computer program products for managing object lifetime in a cyclic graph. Embodiments of the invention include preparing for reclamation of and reclaiming allocated system resources, for example, from a graph of objects that mixes different resource reclamation techniques. In some embodiments, a computer system determines that garbage collection is to be implemented. In response to determining that garbage collection is to be implemented, references between objects managed in accordance with garbage collection and objects managed in accordance with reference counting are detected. A reference type (e.g., direct, indirect, standard, tracked, weakened, etc.) for any detected references is also determined. Garbage collection is implemented to determine if any allocated system resources can be reclaimed. Garbage collection considers references and reference types between objects managed in accordance with garbage collection and objects managed in accordance with reference counting as part of the system resource reclamation determination.

In general, objects can request creation of and/or removal of references to and/or from other objects. For example, when an object is to be collected (e.g., to reclaim system resources), other objects referenced from the to be collected object can be notified prior to removal of the to be collected object from a graph. In response to the notification, a referenced object can disconnect a weakened reference from the referenced object to a further object. Garbage collection can then continue to determine if any further allocated system resources can be reclaimed. Continued garbage collection considers that the weakened reference from the other object to the further object is disconnected.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
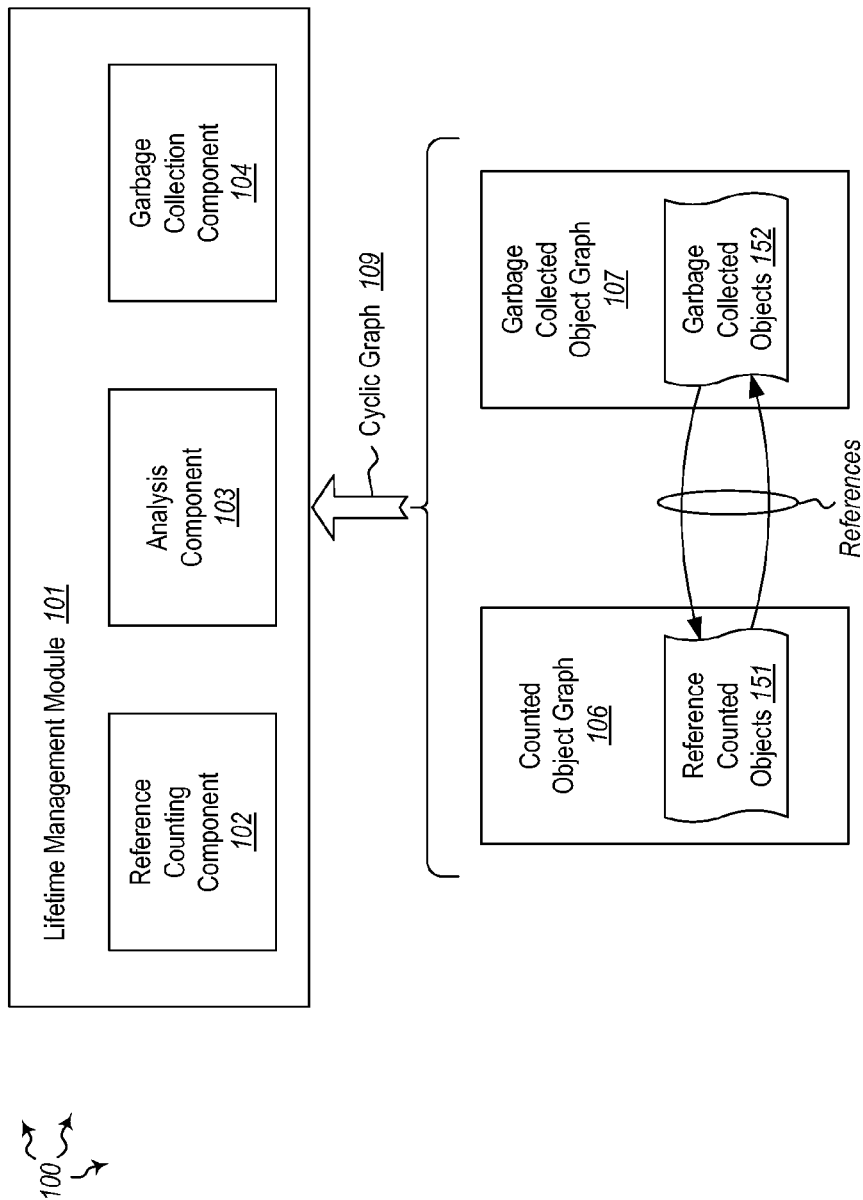
FIG. 1A illustrates an example computer architecture that facilitates managing object lifetime in a cyclic graph.

The present invention extends to methods, systems, and computer program products for managing object lifetime in a cyclic graph. Embodiments of the invention include reclaiming allocated system resources, for example, from a graph of objects that mixes different resource reclamation techniques. In some embodiments, a computer system determines that garbage collection is to be implemented. In response to determining that garbage collection is to be implemented, references between objects managed in accordance with garbage collection and objects managed in accordance with reference counting are detected. A reference type (e.g., direct, indirect, standard, tracked, weakened, etc.) for any detected references is also determined. Garbage collection is implemented to determine if any allocated system resources can be reclaimed. Garbage collection considers references and references types between objects managed in accordance with garbage collection and objects managed in accordance with reference counting as part of the system resource reclamation determination.

In general, objects can request creation and/or removal of references to and/or from other objects. For example, when an object is to be collected (e.g., to reclaim system resources), other objects referenced from the to be collected object can be notified prior to removal of the to be collected object from a graph. In response to the notification, a referenced object can disconnect a weakened reference from the referenced object to a further object. Garbage collection can then continue to determine if any further allocated system resources can be reclaimed. Continued garbage collection considers that the weakened reference from the other object to the further object is disconnected.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within the description and following claims, a "Reference Wrapper" ("RW") is defined as an object reclaimed in accordance with garbage collection (which hereinafter may be referred to as a "GC object") and that stores a reference from another GC object to a further object that is reclaimed in accordance with reference counting (which hereinafter may be referred to as a "Ref. Counted object"). That is, a RW stores a reference from a GC object to a Ref. Counted object.

Within the description and following claims, a "Counted Wrapper" ("CW") is defined as a Ref. Counted object that stores a reference from another Ref. Counted object to a GC object. That is, a CW stores a reference form a Ref. Counted object to a GC object.

Within the description and following claims, a "standard reference" is defined as any ref-counted reference. For instance, a common object model ("COM") reference is an example of an object ref-counting algorithm. A standard reference can be implemented in accordance with an AddRef/Release pattern.

Within the description and following claims, a "tracked reference" is defined as a reference similar to a standard reference but that also communicates to an object during garbage collection. The communication can indicate whether a Ref. Counted object (e.g., a CW) is reachable in some way (either directly or indirectly) other than via an RW. When a Ref. Counted object is reachable other than via an RW, the Ref. Counted object can be protected (or "pegged"). When protected, the Ref. Counted object can survive garbage collection even if no RW or other GC object that directly references the Ref. Counted object survives garbage collection. When a Ref. Counted object is only reachable via an RW, the Ref. Counted object is not protected.

With the description and following claims, a "weak reference" is a reference used to refer to an object without keeping it from being reclaimed. That is, a weak reference does not control the lifetime of an object directly referenced by the weak reference.

In some embodiments, prior to garbage collection (e.g., when the GC system is identifying GC objects that can be removed from memory), a GC system goes to every RW and determines what CWs can be reached via the counted object graph. If there are multiple ways to get from an RW target to a CW, one or more can be found. For every discovery, a GC dependency is created between the RW and the CW target (which is another GC object). Thus, if the RW object doesn't get collected during the GC operation, the target of the CW is not collected either. That is, the RW is a protector of the lifetime of the CW target.

In other embodiments, prior to garbage collection, the counted object system identifies CWs that should be pegged. A CW should be pegged if there is some way to get to the CW other than via an RW (directly or indirectly). That is, the case where a CW target should be protected from garbage collection even if no RW or other GC object that directly references the CW survives the garbage collection process.

These pre-collection operations can be used to protect references between counted objects with a locking mechanism.

FIG. 1A illustrates an example computer architecture 100 that facilitates managing object lifetime in a cyclic graph. Computer architecture 100 includes lifetime management module 101, counted object graph 106, and garbage collected object graph 107. Ref. Counted objects 151 in counted object graph 106 can reference GC objects 152 in garbage collected object graph 107 and vice verse. The references between Ref. Counted objects 151 and GC objects 152 can form cyclic graph 109.

In general, lifetime management module 101 is configured to manage object lifetime in a cyclic graph, such as, for example, cyclic graph 109. As depicted, lifetime management module 101 includes reference counting component 102, analysis component 103, and garbage collection component 104.

Reference counting component 102 is configured to calculate references on objects within a cyclic graph. Reference counting component 102 can employ most any reference counting technique to calculate the references on objects. The references can include external references or internal references between objects. Reference counting component 102 can determine the total number of references on an object and accordingly assign a reference count the object.

Analysis component 103 is configured to analyze references on objects in a cyclic graph. Based on the analysis, analysis component 103 can weaken or strengthen the references between objects. Analysis component 103 can determine the transitioning of lifetime management from a reference counting system to a garbage collection system and back, based on the analysis.

Generally, lifetime management module 101 can destroy or free unused objects by employing garbage collection component 104. When an object is not reachable, such that no references, direct or indirect, to the object exist, the object can be collected. Garbage collection component 104 can determine objects are to be destroyed based on the reachability information for the objects. Reachability information can be provided by reference counting component 102 and/or analysis component 103.

Embodiments of the invention include synchronizing ref-counted information with garbage collection. Reference information from a ref-counted side to a GC side is provided during or as part of a GC process. That is, references from RWs to CW targets is made during GC, and can be thrown away after the GC process is complete (are re-created as appropriate on the next GC). Alternately and/or in combination, some type of caching can be used for performance optimizations.

Figure 1B:
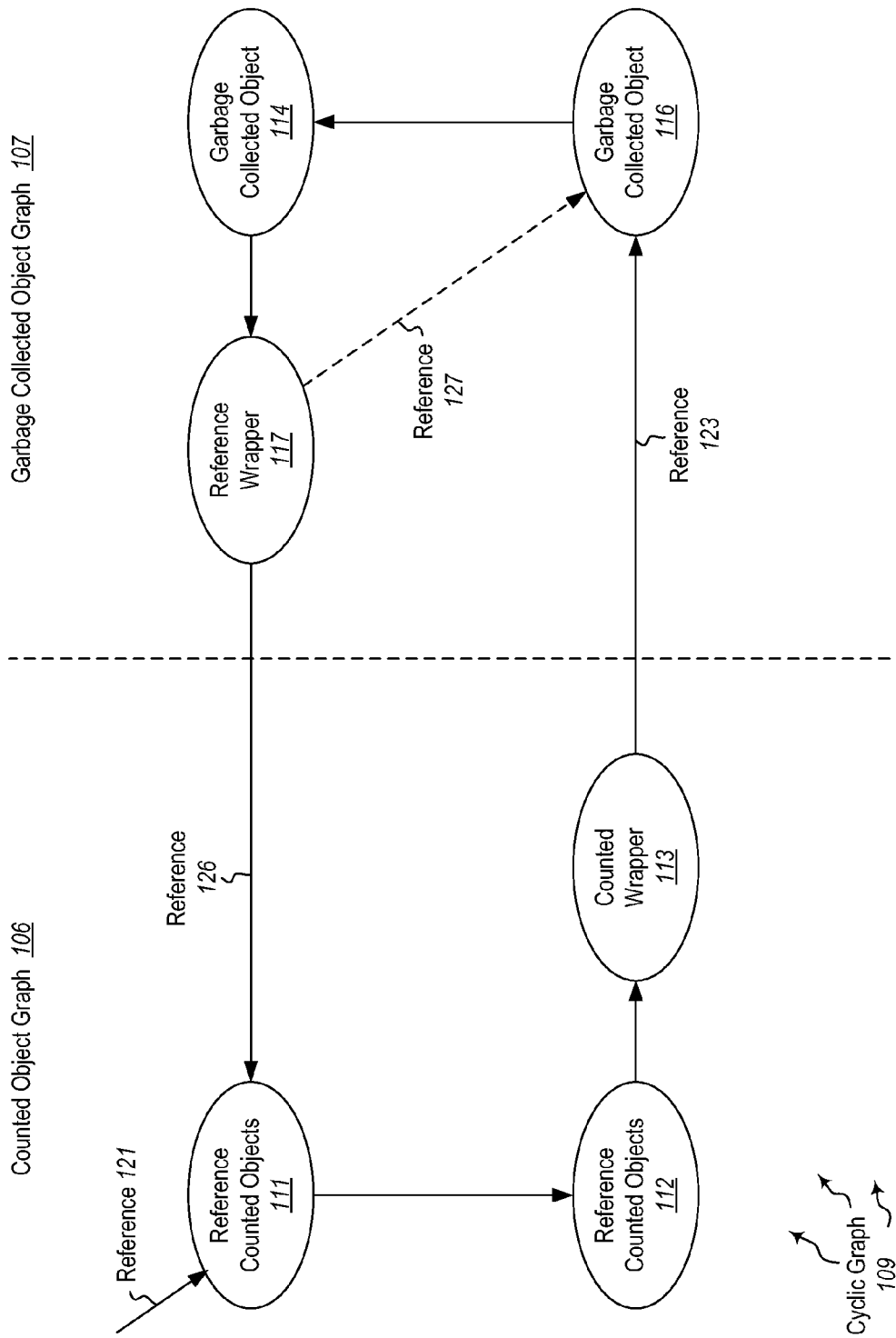
FIG. 1B illustrates an example cyclic graph.

FIG. 1B illustrates an example cyclic graph 109. Referring to FIG. 1B, cyclic graph 109 includes Ref. Counted objects 111 and 112, GC objects 114 and 116, counted wrapper 113, and reference wrapper 117. GC object 114 references Ref. Counted object 111 via reference wrapper 117 (reference 126). Ref. Counted object 112 references GC object 116 via counted wrapper 113 (reference 123). Reference 121 (an external reference) also references Ref. counted object 111.

Figure 2:
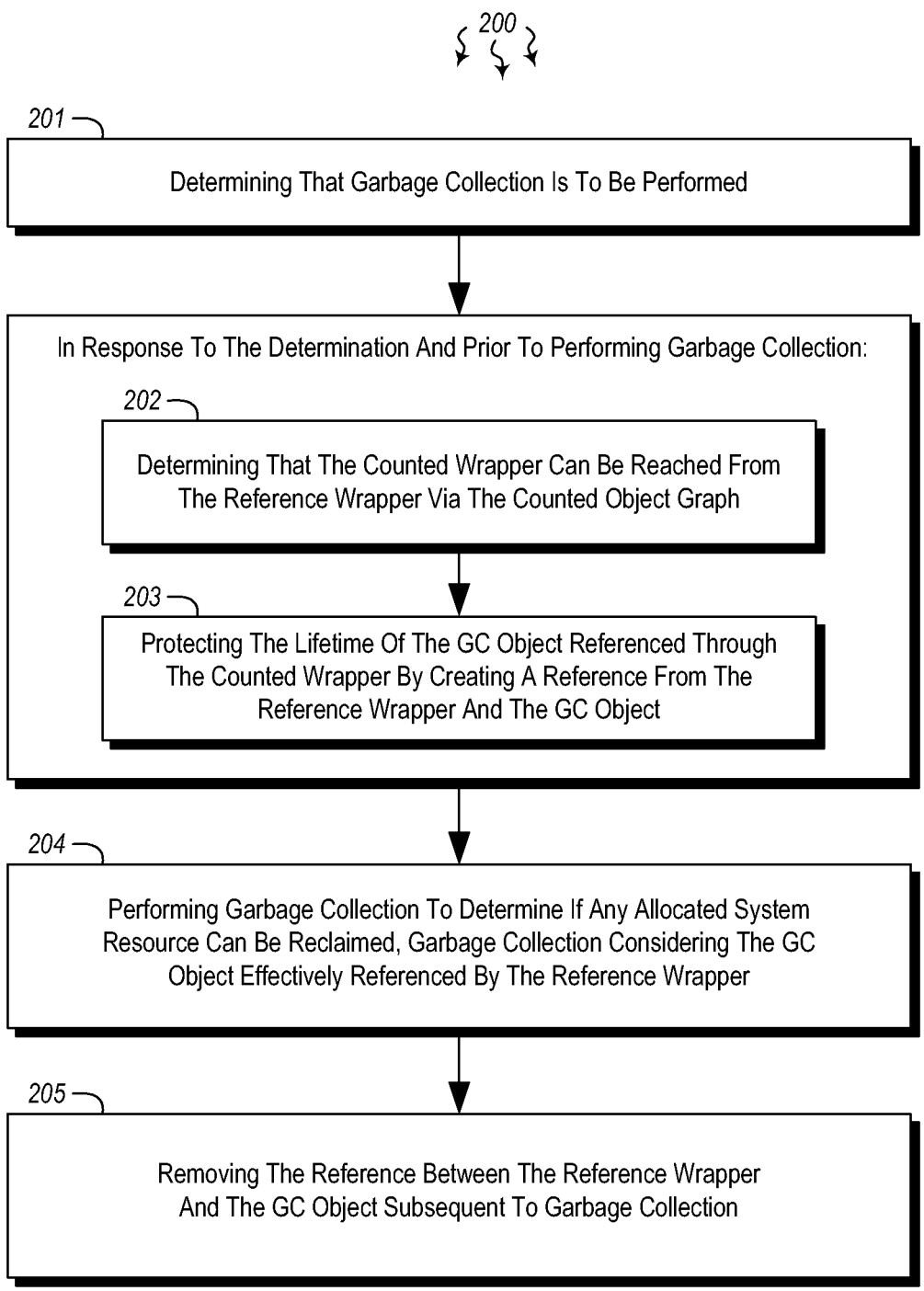
FIG. 2 illustrates a flow chart of an example method for synchronizing reference information from a counted object graph with a garbage collected object graph in preparation for an attempt to reclaim system resources.

FIG. 2 illustrates a flow chart of an example method 200 for managing object lifetime in a cyclic graph. Method 200 will be described with respect to the components of computer architecture 100 and cyclic graph 109 as depicted in FIG. 1B Method 200 includes an act of determining that garbage collection is to be performed (act 201). For example, garbage collection component 104 can that garbage collection of cyclic graph 109 is to be performed.

In response to the determination and prior to performing garbage collection, method 200 includes an act of determining that a counted wrapper can be reached from a reference wrapper via the counted object graph (act 202). For example, analysis component 103 can determine that counted wrapper 113 can be reached from reference wrapper 117. In response to the determination and prior to performing garbage collection, method 200 also includes an act of protecting the lifetime of the GC object referenced through the counted wrapper by creating a reference from the reference wrapper to the GC object (act 203). For example, analysis module 103 can protect GC object 116 by creating reference 127 from reference wrapper 117 to GC object 116.

Method 200 includes an act of performing garbage collection to determine if any allocated system resource can be reclaimed, garbage collection considering the GC object effectively referenced by the reference wrapper (act 204). For example, garbage collection component 104 can perform garbage collection on cyclic graph 109. Garbage collection can determine if any resources allocated for objects of cyclic graph 109 can be reclaimed. Garbage collection component 104 can consider that GC object 116 is effectively references by references wrapper 117 (reference 127).

Method 200 includes an act of removing the reference between the reference wrapper and the GC object subsequent to garbage collection (act 205). For example, subsequent to garbage collection on cyclic graphic 109, analysis module 103 can remove reference 127

Figure 1C:
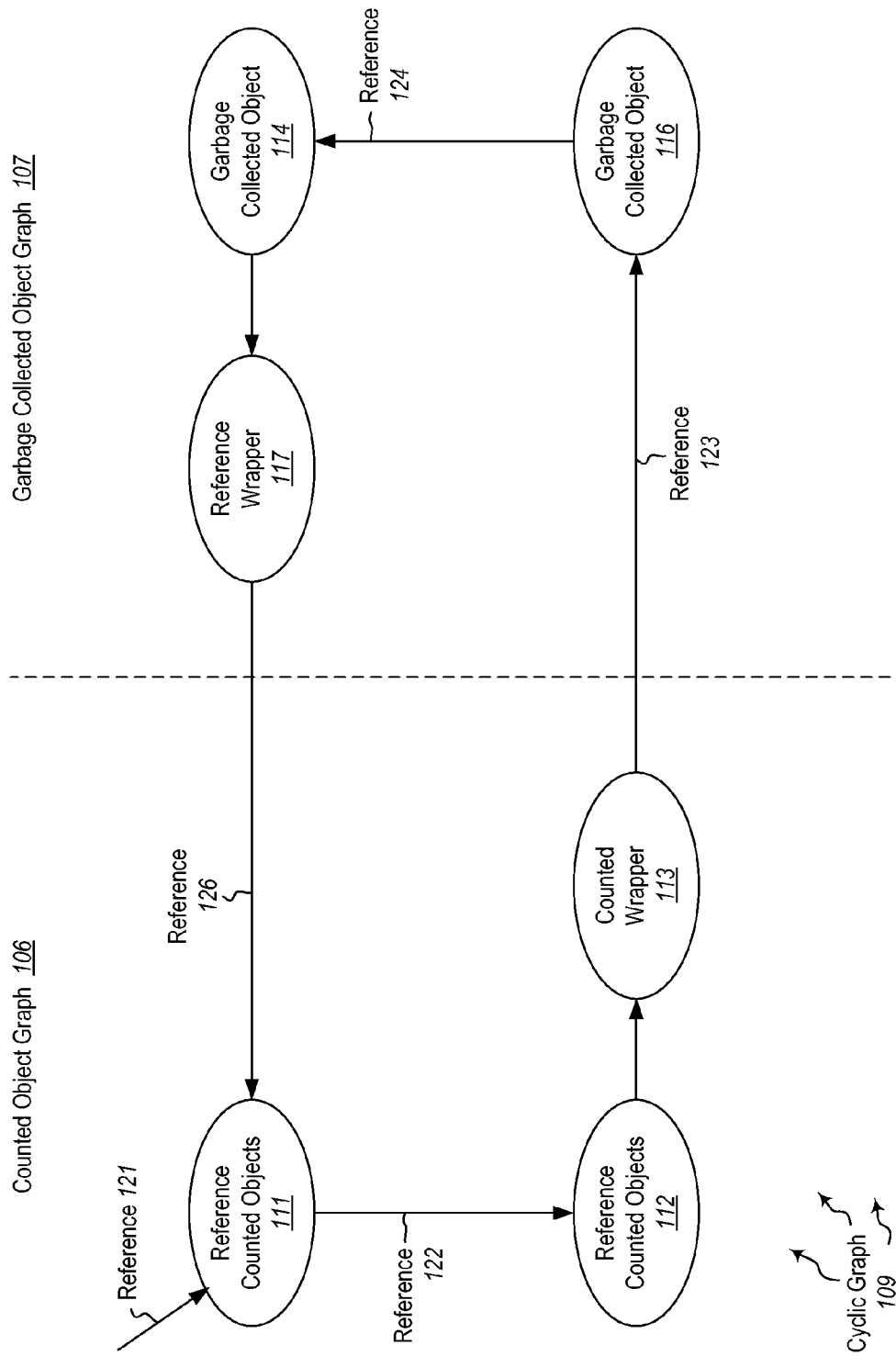
FIG. 1C illustrates an example cyclic graph.

FIG. 1C illustrates an example cyclic graph 109. Similar to FIG. 1B, cyclic graph 109 in FIG. 1C includes Ref. Counted objects 111 and 112, GC objects 114 and 116, counted wrapper 113, and reference wrapper 117. GC object 114 references Ref. Counted object 111 via reference wrapper 117 (reference 126). Ref. Counted object 112 references GC object 116 via counted wrapper 113 (reference 123). Reference 121 (an external reference) also references Ref. counted object 111.

Figure 3:
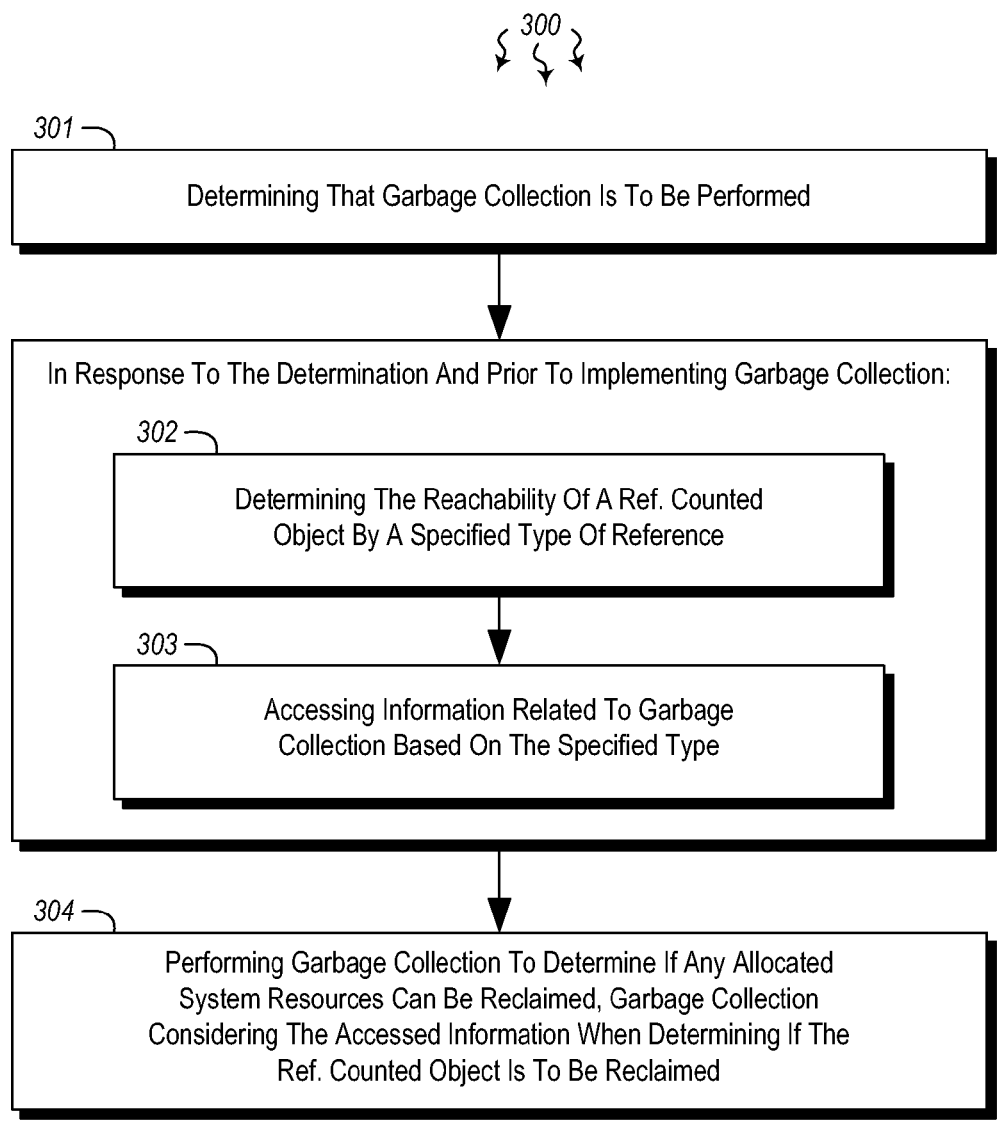
FIG. 3 illustrates a flow chart of an example method for determining how a ref. counted object is referenced in preparation for an attempt to reclaim system resources.

FIG. 3 illustrates a flow chart of an example method 300 for determining how a Ref. Counted object is referenced in preparation for an attempt to reclaim system resources. Method 300 will be described with respect to the components of computer architecture 100 and cyclic graph 109 as depicted in FIG. 1C.

Method 300 includes an act of determining that garbage collection is to be performed (act 301). For example, garbage collection component 104 can that garbage collection of cyclic graph 109 is to be performed.

In response to the determination and prior to implementing garbage collection, method 300 includes an act of the determining the reachability of a Ref. Counted object by specified type of reference (act 302). For example, analysis module 103 can determine the reachability of counted wrapper 113 by standard and/or tracked references. As depicted in FIG. 1C, counted wrapper 113 is reachable from reference 121 (a standard reference) and reference 126 (a tracked reference).

In response to the determination and prior to implementing garbage collection, method 300 an act of accessing information related to garbage collection based on the specified type of reference (act 303). For example, reference counting component 102 can access information from reference 121 and/or reference 126 related to garbage collection of cyclic graph 109. With respect to reference 121, reference counting component 102 can access information indicating that reference 121 is a standard reference.

With respect to reference 126, reference counting component 102 can access information indicating that reference 126 is a tracked reference. From reference 126, reference counting component 102 can also access whether counted wrapper 113 is reachable via objects other than RWs. In FIG. 1C, reference 126 would indicate the counted wrapper 113 is reachable only from reference wrapper 117. However, based on reachability through standard reference 121, reference counting component 102 can peg counted wrapper 113 for protection during garbage collection.

Method 300 includes an act of performing garbage collection to determine if any allocated system resources can be reclaimed, garbage collection considering the accessed information when determining if the ref. counted object is to be reclaimed (act 304). For example, garbage collection component 104 can perform garbage collection on cyclic graph 109. Garbage collection can consider information accessed from references 121 and 126. Based on counted wrapper 113 being pegged by reference counting component 102, counted wrapper 113 is not reclaimed (nor are any other objects in cyclic graph 109) and remains in memory.

That is, since reference 121 exists, counted wrapper 113 is pegged. Pegging counted wrapper 113 indicates that GC object 116 is considered globally reachable by garbage collection component 104. During garbage collection, none of the objects are removed. Garbage collection component 104 keeps GC object 116 alive, and reference 124 causes the garbage collection to keep GC object 114 alive and that in turn keeps RW 117 alive. Since RW 117 keeps a counted reference on Ref. Counted object 111, Ref. Counted objects 111 and 112 stay alive, because of reference 122.

Figure 1D:
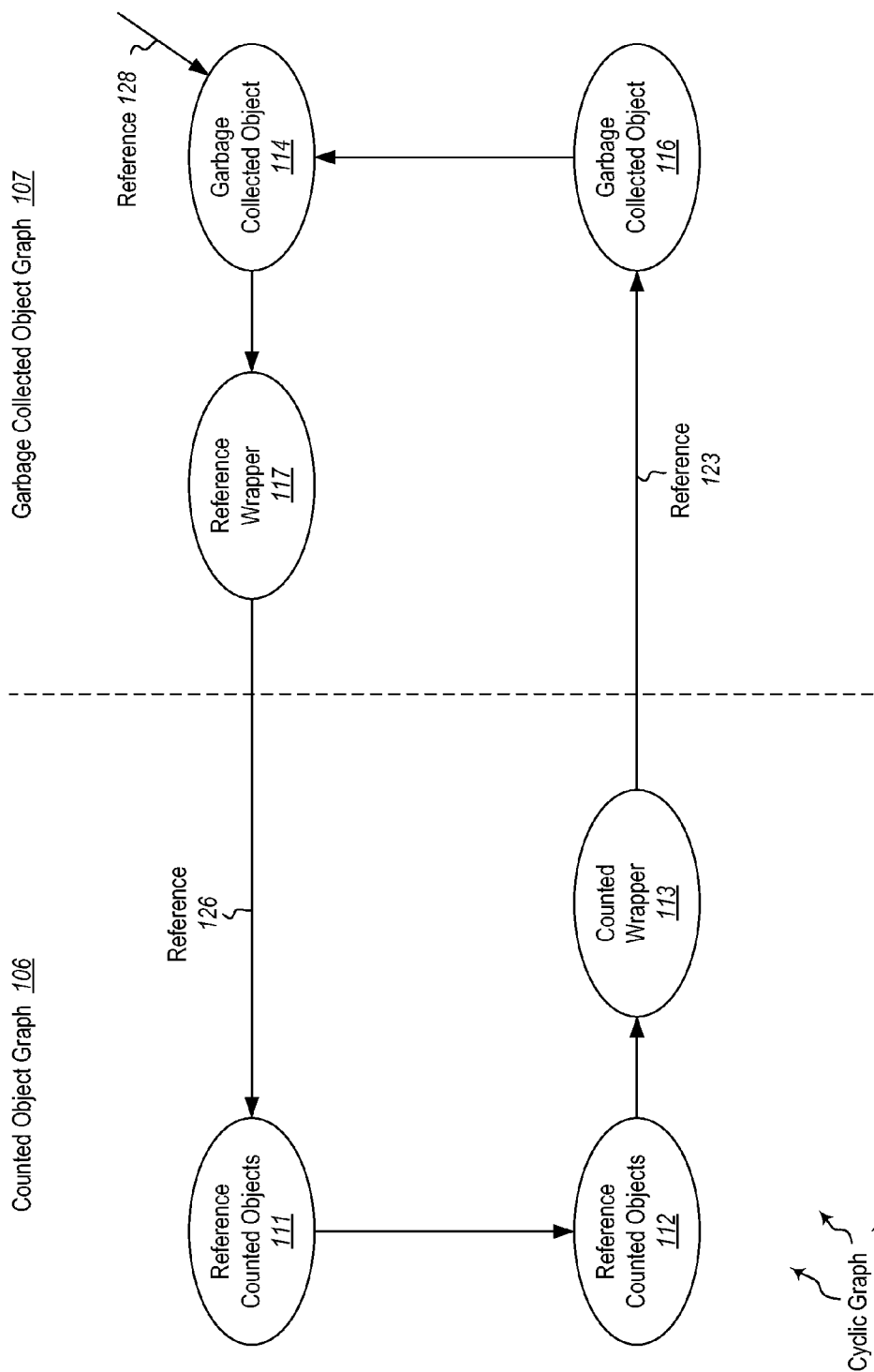
FIG. 1D illustrates an example cyclic graph.

Referring now to FIG. 1D, FIG. 1D illustrates an example cyclic graph 109. Cyclic graph 109 in FIG. 1D includes Ref. Counted objects 111 and 112, CG objects 114 and 116, counted wrapper 113, and reference wrapper 117. GC object 114 references Ref. Counted object 111 via reference wrapper 117 (reference 126). Ref. Counted object 112 references GC object 116 via counted wrapper 113 (reference 123). Reference 128 (an external reference) also references GC object 114.

If FIG. 1D, analysis module 103 can determine that counted wrapper 113 is reachable from reference 126 (a tracked reference). Reference counting component 102 can access information from reference 126 related to garbage collection of cyclic graph 109. With respect to reference 126, reference counting component 102 can access information indicating that reference 126 is a tracked reference. From reference 126, reference counting component 102 can also access whether counted wrapper 113 is reachable via objects other than RWs.

In FIG. 1D, reference 126 would indicate the counted wrapper 113 is reachable from another object via reference 128. As such, reference counting component 102 can peg counted wrapper 113. Based on counted wrapper 113 being pegged, counted wrapper 113 is not reclaimed (not are any other objects in cyclic graph 109). That is, since reference 128 (a direct or indirect global GC reference to GC object 114) exists, all objects remain in memory. For instance, if reference 128 might not directly be a global GC reference, it might be a reference from an object that itself is referenced by a global GC reference. Reference 128 causes garbage collection component 104 to keep GC object 114 alive, which keeps reference wrapper 117 alive. Referring back to FIG. 1B, a reference similar to reference 127 can keep GC object 116 alive.

Figure 1E:
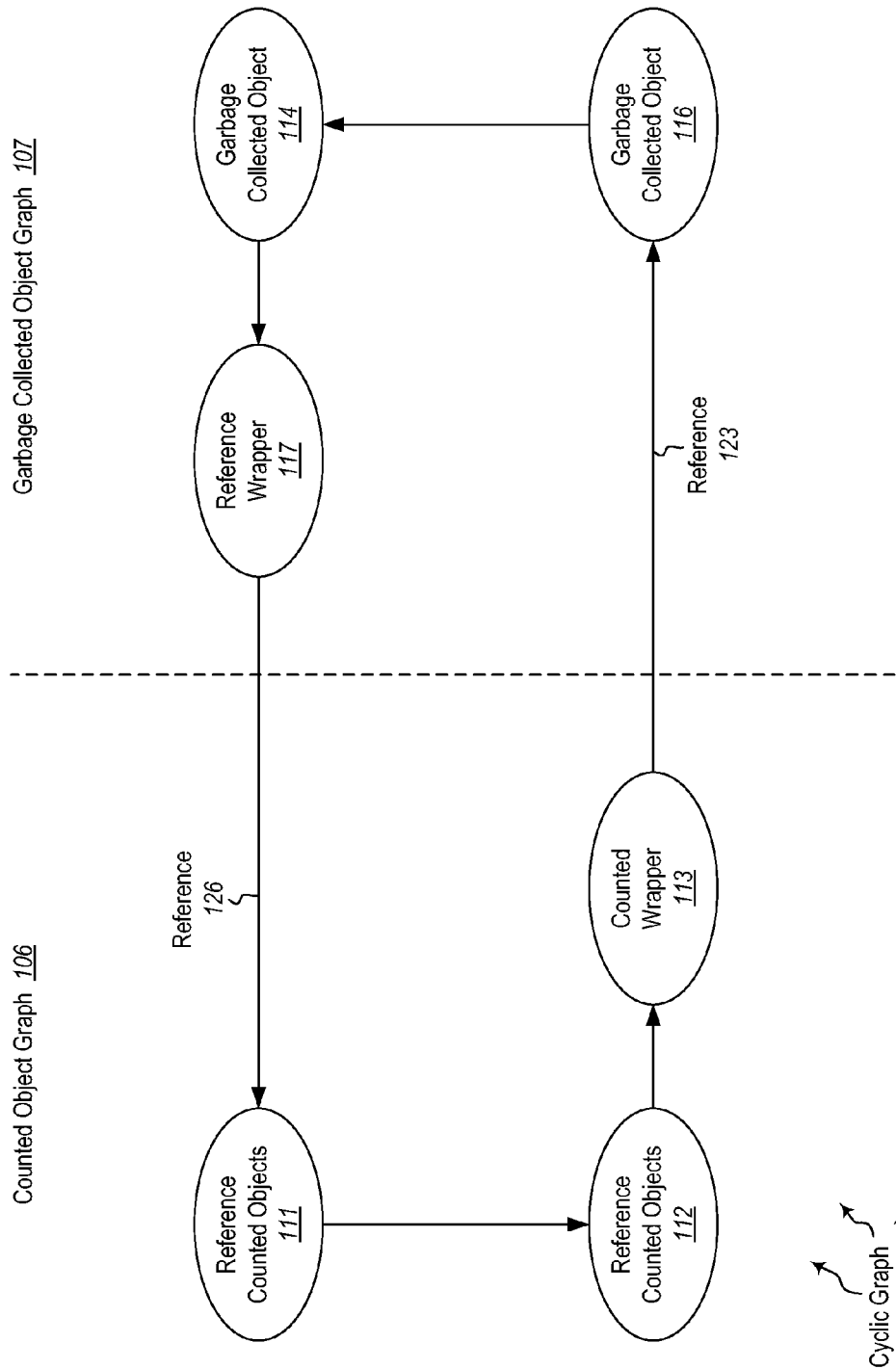
FIG. 1E illustrates an example cyclic graph.

Referring now to FIG. 1E, FIG. 1E illustrates an example cyclic graph 109. Cyclic graph 109 in FIG. 1E includes Ref. Counted objects 111 and 112, GC objects 114 and 116, counted wrapper 113, and reference wrapper 117. GC object 114 references Ref. Counted object 111 via reference wrapper 117 (reference 126). Ref. Counted object 112 references GC object 116 via counted wrapper 113 (reference 123).

If FIG. 1E, analysis module 103 can determine that counted wrapper 113 is reachable from reference 126 (a tracked reference). Reference counting component 102 can access information from reference 126 related to garbage collection of cyclic graph 109. With respect to reference 126, reference counting component 102 can access information indicating that reference 126 is a tracked reference. From reference 126, reference counting component 102 can also access whether counted wrapper 113 is reachable via objects other than RWs.

In FIG. 1E, reference 126 would indicate the counted wrapper 113 is reachable only from reference wrapper 117. As such, reference counting component 102 does not peg counted wrapper 113. Since counted wrapper 113 is not pegged, it can (and would) be reclaimed during garbage collection.

In FIG. 1E, all objects are removed by the garbage collection process. Garbage collection component 104 can remove GC object 114, since there is no reference to GC object 114, and then similarly reference wrapper 117. During the removal of reference wrapper 117, reference 126 (a count on Ref. Counted object 111) is removed. Removal of the count, causes Ref. Counted object 111 to remove itself from memory after removing its count from Ref. Counted object 112. Ref. Counted object 112 similarly removes its count from counted wrapper 113 before removing itself from memory. Counted wrapper 113 removes reference 1123 on GC object 116, which garbage collection component 104 recognizes as a signal to remove GC object 116 from memory.

Further embodiments of the invention include collection notification. A GC object notifies a Ref. Counted object when it is collected but prior to finalization (described later in this description). This notification can account for Ref. Counted objects not actually being released until the GC object is finalized. It also permits weak references to on the Ref. Counted side to be disconnected.

Figure 1F:
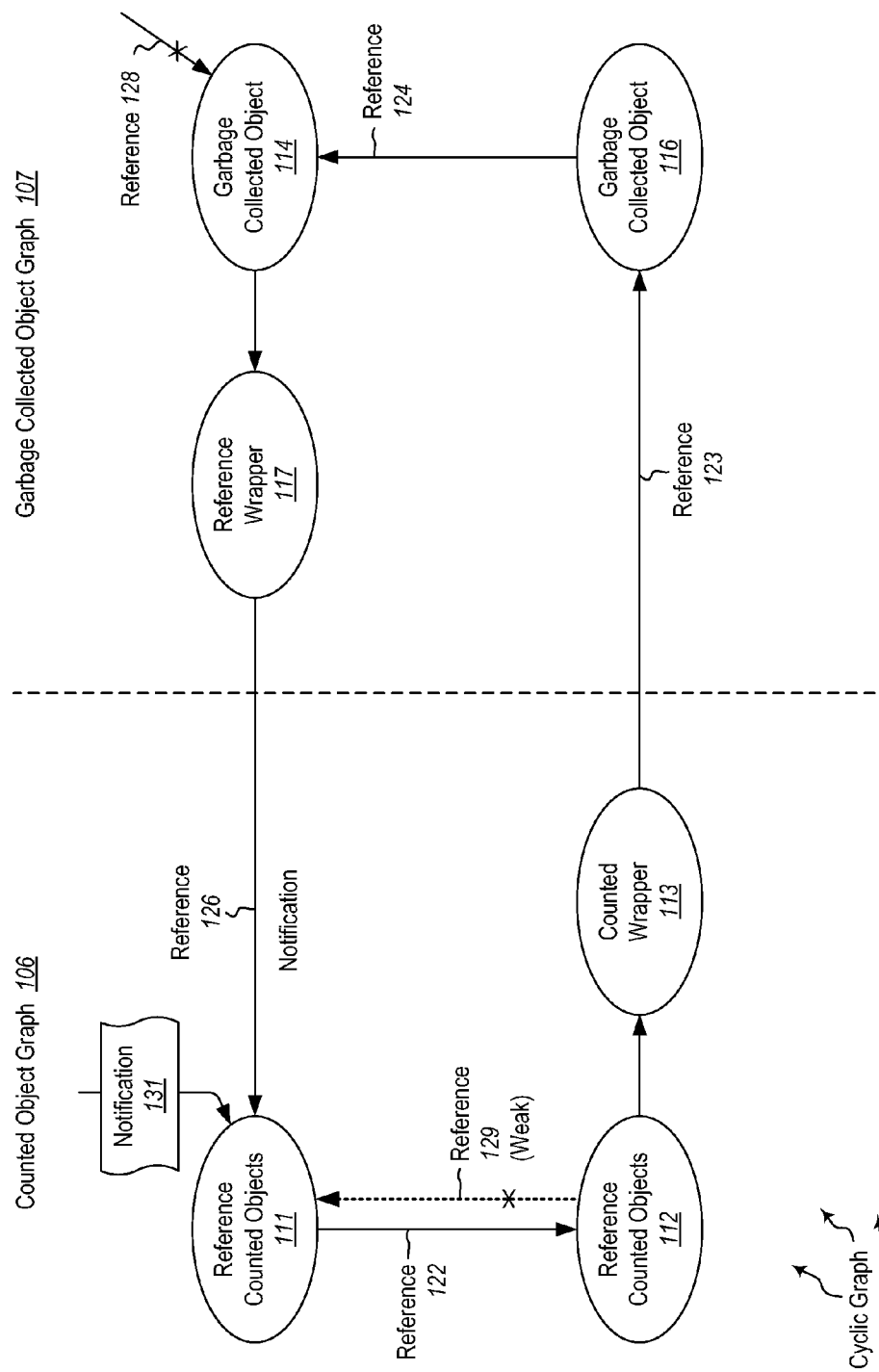
FIG. 1F illustrates an example cyclic graph.

FIG. 1F illustrates an example cyclic graph. Referring now to FIG. 1F, FIG. 1F illustrates an example cyclic graph 109. Cyclic graph 109 in FIG. 1F includes Ref. Counted objects 111 and 112, CG objects 114 and 116, counted wrapper 113, and reference wrapper 117. GC object 114 references Ref. Counted object 111 via reference wrapper 117 (reference 126). Ref. Counted object 112 references GC object 116 via counted wrapper 113 (reference 123). Reference 128 (an external reference) also references GC object 114. Weak reference 129 references Ref. Counted Object 111 from Ref. Counted Object 112.

Figure 4:
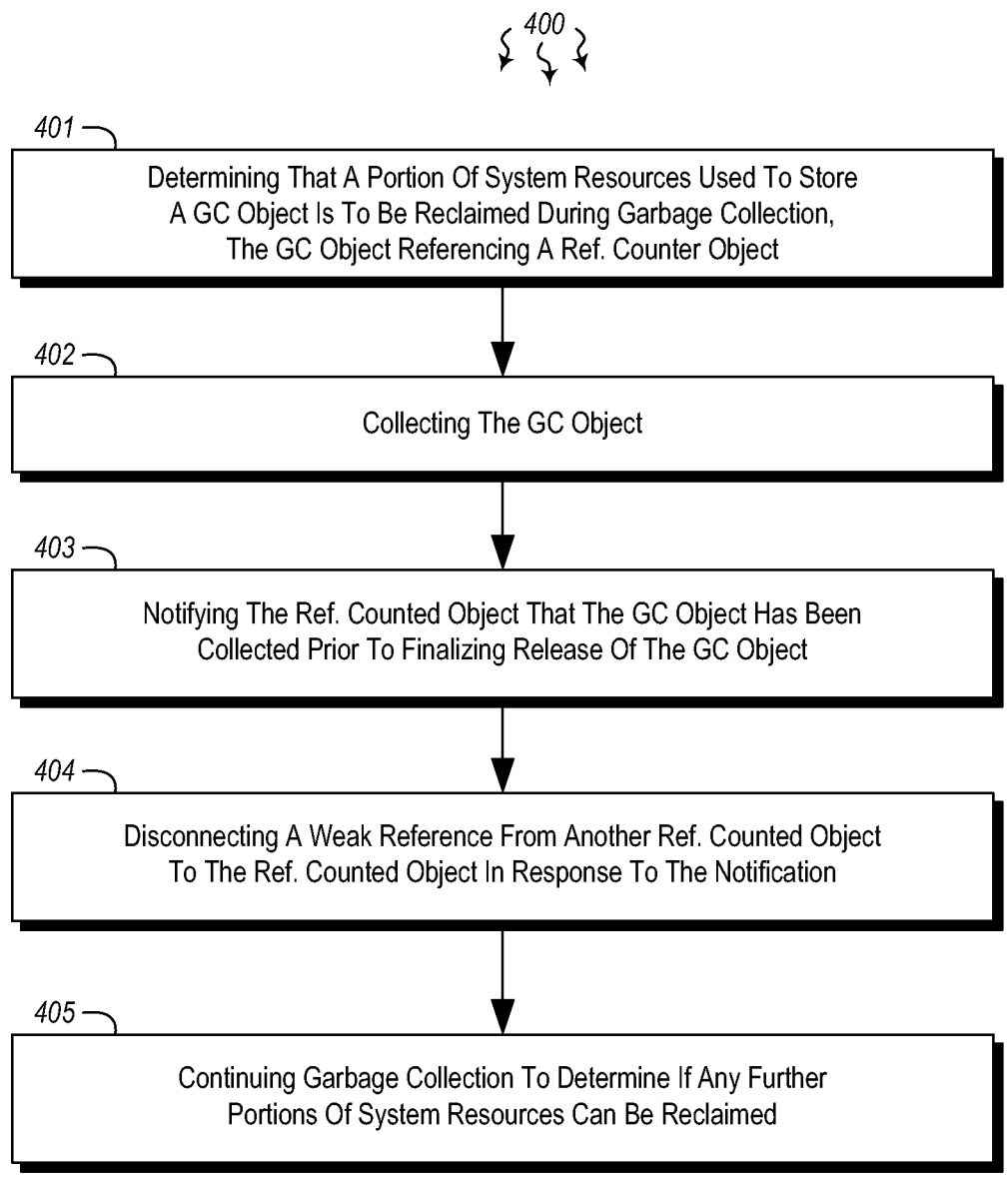
FIG. 4 illustrates a flow chart of an example method for reclaiming allocated system resources.

FIG. 4 illustrates a flow chart of an example method 400 for reclaiming allocated system resources. Method 400 will be described with respect to the components of computer architecture 100 and cyclic graph 109 as depicted in FIG. 1F.

Method 400 includes an act of determining that a portion of system resources used to store a GC object is to be reclaimed during garbage collection, the GC object referencing a Ref. Counted object (act 401). For example, garbage collection component 104 can determine that reference 128 is removed and thus GC object 114 is to be reclaimed during garbage collection. Through reference wrapper 117, GC object 114 can reference Ref. Counted object 111. Method 400 includes an act of collecting the GC object (act 402). For example, garbage collection component 104 can collect GC object 114.

Method 400 includes an act of notifying the Ref. Counted object that the GC object has been collected prior to finalizing release of the GC object (act 403). For example, analysis module 103 can send notification 131 to Ref. Counted object 111 prior to finalizing release of GC object 114. In some embodiments, notification 131 is also sent prior to asynchronously removing the reference to the Ref. Counted object. Method 400 includes an act of disconnecting a weak reference from another Ref. Counted object to the Ref. Counted object in response to the notification (act 404). For example, weak reference 129 can be disconnected in response to notification 131.

Method 400 includes an act of continuing garbage collection to determine if any further portions of system resources can be reclaimed (act 405). For example, garbage collection component 104 can continue garbage collection of cyclic graph 109.

Other additional embodiments include a Ref. Counted object requesting a GC reference to another Ref. Counted object. That is, a Ref. Counted object can request that a CW be created that references an RW to another Ref. Counted object. Requesting a CG reference can be useful to intentionally create a cycle, but without causing a leak.

Further additional embodiments include a Ref. Counted object requesting that a GC object remove its reference to the Ref. Counted object. That is, it may be a GC object is configured to release its reference to the Ref. Counted object during finalization, but in the case of this request, the release can happen immediately.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors and system memory, a method for synchronizing reference information between a counted object graph and a garbage collected object graph in preparation for an attempt to reclaim system resources, the method comprising:
   building, in the system memory, a cyclic object graph, the cyclic object graph including:
      (i) a counted object graph including one or more reference counted objects having their lifetime managed in accordance with reference counting; and
      (ii) a garbage collected ("GC") object graph including one or more GC objects having their lifetime managed in accordance with garbage collection,
      a particular reference counted object of the counted object graph referencing a particular GC object of the GC object graph through a counted wrapper of the counted object graph, the particular GC object referencing the particular reference counted object through a reference wrapper of the GC object graph, the counted wrapper storing a reference from another reference counted object to a further object that is reclaimed in accordance with GC and being reclaimed in accordance with reference counting, the reference wrapper storing a reference from another GC object to a further object that is reclaimed in accordance with reference counting and being reclaimed in accordance with GC;
   in preparation for performing garbage collection of objects in the cyclic graph from the system memory:
      determining that the counted wrapper can be reached from the reference wrapper via the counted object graph;
      creating a new reference from the reference wrapper to the particular GC object; and
      protecting the lifetime of the particular GC object referenced through the counted wrapper and the new reference; and
   performing garbage collection to determine if any allocated system resource can be reclaimed from the system memory, garbage collection considering the particular GC object to be effectively referenced by the reference wrapper such that it cannot be reclaimed.

2. The method as recited in claim 1, further comprising removing the new reference between the reference wrapper and the particular GC object subsequent to garbage collection.

3. The method as recited in claim 1, wherein protecting the lifetime of the particular GC object referenced through the counted wrapper comprises creating a dependency for the particular GC object on the reference wrapper.

4. The method as recited in claim 1, wherein determining that the counted wrapper can be reached from the reference wrapper via the counted object graph comprises determining that the counted wrapper can be reached from the reference wrapper via the counted object graph.

5. The method as recited in claim 1, further comprising determining that the counted wrapper references the particular GC object indirectly.

6. The method as recited in claim 1, further comprising determining that the counted wrapper references the particular GC object directly.

7. The method as recited in claim 1, wherein performing garbage collection to determine if any allocated system resource can be reclaimed comprises removing one or more objects to reclaim system memory.

8. At a computer system, the computer system including one or more processors and system memory, a method for determining how a reference counted object is referenced in preparation for an attempt to reclaim system resources, the method comprising:
building, in the system memory, a cyclic object graph, the cyclic object graph including:
(i) a counted object graph including one or more reference counted objects having their lifetime managed in accordance with reference counting; and
(ii) a garbage collected ("GC") object graph including one or more GC objects having their lifetime managed in accordance with garbage collection,
a particular reference counted object of the counted object graph referencing a particular GC object of the GC object graph through a counted wrapper of the counted object graph, the particular GC object referencing the particular reference counted object through a reference wrapper of the GC object graph, the counted wrapper storing a reference from another reference counted object to a further object that is reclaimed in accordance with GC and being reclaimed in accordance with reference counting, the reference wrapper storing a reference from another GC object to a further object that is reclaimed in accordance with reference counting and being reclaimed in accordance with GC;
in preparation for implementing garbage collection of objects in the cyclic graph:
determining whether the counted wrapper is reachable via any objects other than reference wrappers; and
when the counted wrapper is reachable via any objects other than reference wrappers, pegging the counted wrapper to protect the counted wrapper from reclamation during garbage collection; and
performing garbage collection to determine if any allocated system resources can be reclaimed from the system memory, garbage collection preserving the counted wrapper when it is pegged.

9. The method as recited in claim 8, wherein the counted wrapper is determined to be reachable via any objects other than reference wrappers when it is reachable via a standard reference.

10. The method as recited in claim 8, wherein the counted wrapper is determined to be reachable via any objects other than reference wrappers when it is reachable via a tracked reference.

11. At a computer system, the computer system including one or more processors and system memory, a method for reclaiming allocated system resources, the method comprising:
building, in the system memory, a cyclic object graph, the cyclic object graph including:
(i) a counted object graph including one or more reference counted objects having their lifetime managed in accordance with reference counting; and
(ii) a garbage collected ("GC") object graph including one or more GC objects having their lifetime managed in accordance with garbage collection,
a particular reference counted object of the counted object graph referencing a particular GC object of the GC object graph through a counted wrapper of the counted object graph, the particular GC object referencing the particular reference counted object through a reference wrapper of the GC object graph, the counted wrapper storing a reference from another reference counted object to a further object that is reclaimed in accordance with GC and being reclaimed in accordance with reference counting, the reference wrapper storing a reference from another GC object to a further object that is reclaimed in accordance with reference counting and being reclaimed in accordance with GC;
determining that a portion of system resources used to store the particular GC object is to be reclaimed from the system memory during garbage collection;
collecting the particular GC object;
prior to finalizing release of the GC object, notifying the particular reference counted object that the GC object has been collected;
in response to the notification, disconnecting a weak reference from another reference counted object in the counted object graph to the particular reference counted object; and
continuing garbage collection to determine if any further portions of system resources can be reclaimed from the system memory.

12. The method as recited in claim 11, further comprising notifying the particular reference counted object that the particular GC object has been collected prior to asynchronously removing the reference to the particular reference counted object.

13. The method as recited in claim 11, wherein determining that a portion of system resources used to store the particular GC object is to be reclaimed comprises detecting that a reference to the particular GC object was removed.

14. The method as recited in claim 11, wherein continuing garbage collection to determine if any further portions of system resources can be reclaimed comprises reclaiming the particular reference counted object.

* * * * *